March 20, 1945.   E. FRYDMAN   2,371,986
ELECTROMAGNETIC INTERRUPTER
Filed July 27, 1942
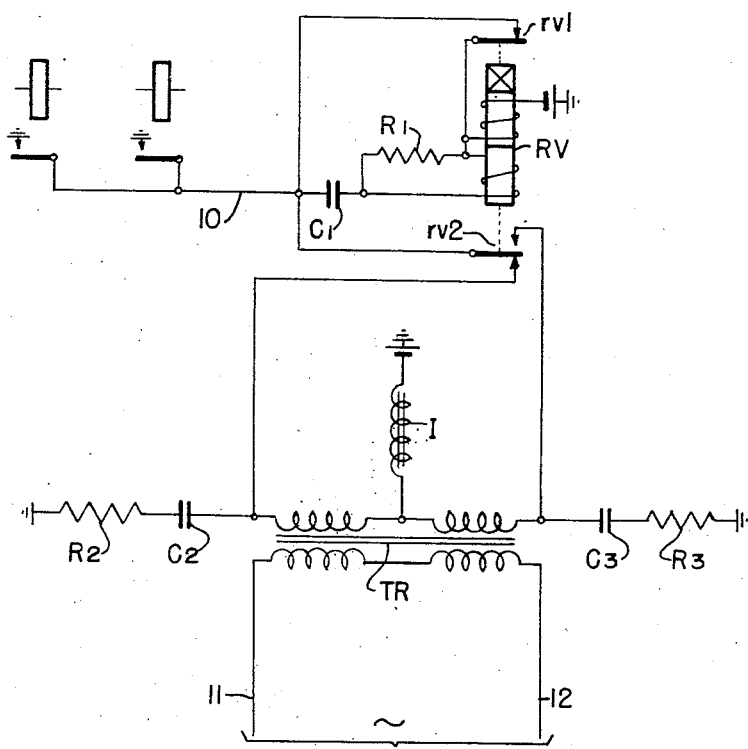
INVENTOR.
EMANUEL FRYDMAN
BY
ATTORNEY Patented Mar. 20, 1945

2,371,986

UNITED STATES PATENT OFFICE 2,371,986

ELECTROMAGNETIC INTERRUPTER

Emanuel Frydman, Liverpool, England, assignor, by mesne assignments, to Automatic Electric Laboratories, Inc., Chicago, Ill., a corporation of Delaware Application July 27, 1942, Serial No. 452,450 In Great Britain October 15, 1941

4 Claims. (Cl. 175—373)

The present invention relates to electromagnetic interrupters, and more particularly to interrupters such as find use as vibratory generators for tones and ringing current in small private telephone exchanges.

As commonly used these comprise telephone type relays modified by the utilisation of weighted armatures and/or weighted moving contact springs in order to govern the required rate of interruption, and while such arrangements are satisfactory, they involve additional manufacturing costs owing to their non-standard construction. The main object of the present invention is to provide improved circuit arrangements for use in conjunction with such devices whereby satisfactory results can be obtained from standard telephone type relays.

According to the invention, in an electromagnetic interrupter arrangement suitable for use in telephone systems for generating alternating current from a direct current supply the frequency of the current generated is largely influenced by a condenser of large capacity the current flow through which serves to modify the energisation of the operating electromagnet.

The invention will be better understood from the following description of one method of carrying it into effect, reference being had to the accompanying drawing which shows circuits of a vibratory ringing current generator suitable for use in small private telephone exchanges.

The device comprises essentially a standard telephone type relay RV adapted on operating its armature rv1 to introduce condenser C1 into its energising circuit and accordingly to operate intermittently at a rate governed primarily by the capacity value of the condenser C1. At its armature rv2 it alternately energises opposite halves of the split primary winding of transformer TR1 and thus in known manner produces alternating ringing current in the secondary winding of this transformer.

Considering now the circuit in more detail, when a ground potential is applied to the common start lead 10 from any of a number of points as indicated diagrammatically, relay RV is energised over its upper winding through contacts rv1. After a short delay period determined by the size of the armature end slug on the winding core, the relay operates and the direct energising circuit for the upper winding is opened at armature rv1 and a circuit becomes effective including condenser C1 and the lower winding which is shunted by resistance R1 in series with the upper winding. The two windings are connected in this circuit in such manner as to assist one another, and hence during the charging up of condenser C1 current continues to flow through the two windings and the relay completes its travel and maintains its armatures rv1 and rv2 operated. The current flow decreases as the condenser charges up, and when it reaches a sufficiently low value the relay will restore to normal and will reclose its armature rv1. It will be noted also that the slug functions during this time to retard the rate of decay of magnetic flux in the core and so further increases the length of the period during which the relay is held operated.

The upper winding of relay RV is now re-energised over resting armature rv1 but the relay is prevented initially from operating due to the effect of the armature end slug and also partly to the discharge of condenser C1 through the lower winding of relay RV in parallel with resistance R1 in a direction such as to produce a flux opposing that produced by the upper winding. After a short delay period, the flux in the upper winding becomes sufficient to re-operate the relay, whereupon the cycle of operations already described repeats itself.

From the foregoing description it will thus be seen that the rate of vibration of the relay is governed chiefly by the capacity value of the condenser C1 which exerts a control on the operated periods of the relay and also to a less extent on the release periods, the latter being brought to an adequate value by the armature end slug on the winding core. The condenser also serves to ensure that the relay completes its operating stroke each time it opens its armature rv2 and in addition provides a spark quench arrangement for this armature.

Armature rv2 operates in well-known manner alternately to energise opposite halves of the centre-tapped primary winding of transformer TR in series with the choke coil I and thereupon to produce in the secondary winding alternating current of a periodicity suitable for bell ringing purposes which extends to the telephone exchange circuits over leads 11 and 12. The rate of vibration is determined primarily by suitable choice of the capacity value for condenser C1. In one practical embodiment which has given satisfactory results, the windings of relay RV were each of 700 ohms resistance while the condenser C1 was of 2 mf. capacity and the resistance R1 which is not essential was of 2000 ohms. Resistances R2 and R3 and condensers C2 and C3 together with choke coil I serve as spark quenching and tone smoothing devices for the D. C. to A. C. conversion arrangements shown.

The invention is not limited in application to the particular circuit arrangement described as it is possible that the relay might comprise a single winding only, across the interrupter contacts of which is connected a condenser and series resistance, the capacity value of the condenser being so chosen as to produce a rate of vibration in accordance with that required.

Furthermore the relay need not be of the type which opens a normally closed contact to interrupt its energising circuit, as the invention could also be applied to a relay which is adapted to vibrate by closing a normally open contact and thereupon short-circuiting its winding. In this case the condenser may be permanently connected across the energising winding of the relay so that the relay cannot operate until the condenser charges and allows a suitable potential to be applied to the winding. The relay in operating will be adapted to short-circuit both its own winding and the condenser, whereupon it will release and the cycle of operations will be repeated.

The invention is moreover not limited in scope to tone and ringing current vibratory generators as it might also be employed with advantage to improve the operation of trembler bells and other interrupted driving circuits.

What I claim as new and desire to secure by Letters Patent is:

1. An electromagnetic interrupter comprising an electromagnet having a pair of windings and a condenser, contacts controlled by said magnet, an energizing circuit including one of said windings for energizing said magnet to operate said contacts, a second energizing circuit for the magnet made effective by the operation of said contacts including the condenser and both windings in series for maintaining the magnet energized for an interval, a third circuit including the other of said windings and the condenser for preventing reenergization of said magnet, said contacts controlled by said magnet for rendering said circuits effective thereafter.

2. An electromagnetic interrupter comprising a double wound relay having contacts normally short-circuiting one of its windings, means for closing a circuit for the other winding to energize the relay and open said contacts, a condenser, the opening of said contacts including said one winding and said condenser in series with said other winding in the said energizing circuit, said windings assisting each other to maintain the relay energized in said last circuit until the condenser is charged, said relay deenergized when the condenser is charged to complete a discharge circuit for said condenser through said one winding and to complete the original energizing circuit for said other winding, said windings opposing each other during the discharge period of said condenser to prevent reenergization of the relay for a predetermined time.

3. A delayed action interrupter comprising only a double wound relay and a condenser, means for closing an energizing circuit for the relay including a pair of break contacts on the relay and one of its windings, said contacts opened by the energization of said relay to complete a second energizing circuit for the same including both windings thereof and the condenser to maintain the relay energized during the charging of the condenser, said relay deenergizing when the condenser is charged to complete the original energizing circuit for said one winding and to complete a discharge circuit for the condenser through said other winding in a manner to cause the flux produced by said windings to oppose each other to prevent reenergization of the relay by said one winding until the condenser is discharged.

4. An electromagnetic interrupter comprising a magnet having a core with a pair of windings thereon and a condenser, contacts operated by the magnet, a circuit including a source of current, both windings in series aiding relation and said condenser, a shunt circuit for one winding and the condenser normally closed by said contacts, and open by the energization of said magnet, and a local circuit including said contacts, said shunted winding, and said condenser, the discharge current from said condenser in said local circuit causing a magnetic flux in said core produced by the shunted winding to oppose the flux produced in the core by the other winding.

EMANUEL FRYDMAN.